United States Patent [19]

Moore

[11] Patent Number: 4,533,274

[45] Date of Patent: Aug. 6, 1985

[54] FLEXIBLE JOINT MEANS

[75] Inventor: Alan F. Moore, Burbage, England

[73] Assignee: Dunlop Limited, London, England

[21] Appl. No.: 423,263

[22] Filed: Sep. 24, 1982

[30] Foreign Application Priority Data

Jan. 27, 1982 [GB] United Kingdom ................ 8202310

[51] Int. Cl.³ .............................................. F16D 3/80
[52] U.S. Cl. ....................................... 403/31; 403/138
[58] Field of Search ....................... 403/31, 32, 34, 35, 403/36, 37, 38, 39, 51, 135, 138

[56] References Cited

U.S. PATENT DOCUMENTS

| 3,111,172 | 11/1963 | Gorndt et al. | 403/220 X |
| 3,192,782 | 7/1965 | Wantz | 403/51 |
| 3,261,620 | 7/1966 | Cadiou | 403/38 X |
| 3,292,712 | 12/1966 | Schmidt | 403/220 X |
| 3,638,973 | 2/1972 | Poletti | 403/31 X |
| 3,854,557 | 12/1974 | Wilcox | 403/138 X |
| 3,951,557 | 4/1976 | Herbenar | 403/138 |
| 4,259,027 | 3/1981 | Hata | 403/138 X |
| 4,439,055 | 3/1984 | Quigg et al. | 403/406 X |

FOREIGN PATENT DOCUMENTS

| 1310611 | 10/1962 | France | 403/31 |
| 610958 | 10/1948 | United Kingdom . | |
| 1011944 | 12/1965 | United Kingdom | 403/31 |
| 1387682 | 3/1975 | United Kingdom . | |
| 1586178 | 3/1981 | United Kingdom . | |
| 1591227 | 6/1981 | United Kingdom . | |

Primary Examiner—Dennis L. Taylor
Attorney, Agent, or Firm—Stevens, Davis, Miller & Mosher

[57] ABSTRACT

Flexible joint means in which a flexible bearing positioned between a hollow outer member and part of an inner member received within the outer member accommodates tension loads applied to either member and a substantially incompressible fluid contained within a fluid tight cavity in the outer member accommodates compression loads applied to either member.

10 Claims, 12 Drawing Figures

FLEXIBLE JOINT MEANS

BACKGROUND OF THE INVENTION

This invention concerns improvements in or relating to flexible joint means.

One known flexible joint means comprises an annular flexible bearing acting between confronting axially aligned ball and socket surfaces of a pair of members to accommodate relative pivotal movement between the members in any plane containing the longitudinal axis of the joint means.

A disadvantage of this type of joint means is that the flexible bearing although capable of accommodating high compression loads can only withstand relatively low tension loads before rupturing. As a result for applications where compression and tension loads of similar magnitude are to be accommodated it is necessary to provide joint means incorporating two flexible bearings arranged one to carry the compression loads and the other to carry the tension loads. This is unsatisfactory as not only is the arrangement expensive to manufacture but also an undesirable increase in the conical stiffness of the assembly arises from the use of two flexible bearings.

According to the present invention there is provided flexible joint means comprising a hollow outer member, an inner member having a body portion located within the outer member and a stem portion projecting outwards through an opening in the outer member, a flexible bearing acting between confronting surfaces on the inner and outer members and a substantially incompressible fluid contained within a fluid tight chamber within the outer member.

Joint means according to the present invention is capable of carrying both tension and compression loads, tension loads being accommodated mainly by the flexible bearing in compression and compression loads being accommodated mainly by increase in pressure of the incompressible fluid within the chamber.

Preferably the fluid within the chamber, for example gas or liquid or a combination thereof, is under pressure in the unloaded condition of the joint means, the fluid pressure serving to pre-load the flexible bearing in compression.

The degree of pre-loading of the flexible bearing is preferably chosen to lie within the operating range of the tension loads which the joint means is designed to carry. In consequence the overall working deflection of the bearing is reduced and also the occurrence of tension loads in the bearing is avoided both of which contribute to an improved fatigue life of the bearing.

Preferably the sealed chamber is defined at least in part by a control element e.g. a flexible diaphragm or slidable shuttle subjected on one side to the fluid pressure in the chamber and on the opposite side to an external fluid pressure which serves to prevent the occurrence of negative pressure in the fluid contained within the chamber. External fluid pressure may be that of a fluid surrounding the joint means e.g. atmospheric air pressure or the pressure of fluid contained within a sealed cavity acting on the opposite side of the control element to the fluid in the chamber.

Preferably the joint means is capable of accommodating relative pivotal movement between the inner and outer members. Thus the confronting axial aligned surfaces on the inner and outer members may be part-cyclindrical allowing pivotal movement in one plane containing the longitudinal axis of the joint means but more preferably the surfaces are part-spherical allowing omnidirectional pivotal movement in any plane containing the longitudinal axis of the joint means. Preferably the confronting surfaces have a common central axis (part-cylindrical) or centre of curvature (part-spherical).

The flexible bearing is preferably of laminate construction consisting of interleaving layers of elastomeric material e.g. rubber and reinforcement plates but may comprise elastomeric material alone. The bearing has end faces complementary to the profile of the confronting surfaces on the inner and outer members and where such surfaces are of curved profile and the bearing is of laminate construction the individual layers/plates of the bearing are of similar curved profile. The end faces of the bearing may be bonded to the confronting surfaces or attached to metal end rings which are secured to the surfaces by any known means. The bearing may be annular with a central opening through which the stem portion of the inner member extends and may be of unitary construction or consist of a plurality of individual segments.

For applications where the joint means is required to accommodate large conical deflection two inner members separate from one another are arranged back-to-back with the associated stem portions projecting outwards in opposite directions through respective openings in the outer member with a respective flexible bearing acting between each inner member and the outer member and a substantially incompressible fluid contained within the fluid tight chamber within the outer member and acting between the inner members.

BRIEF DESCRIPTION OF THE DRAWINGS

The invention will now be described in more detail, by way of example only, with reference to the accompanying drawings wherein.

DESCRIPTION OF THE PREFERRED EMBODIMENT

Figure 1:
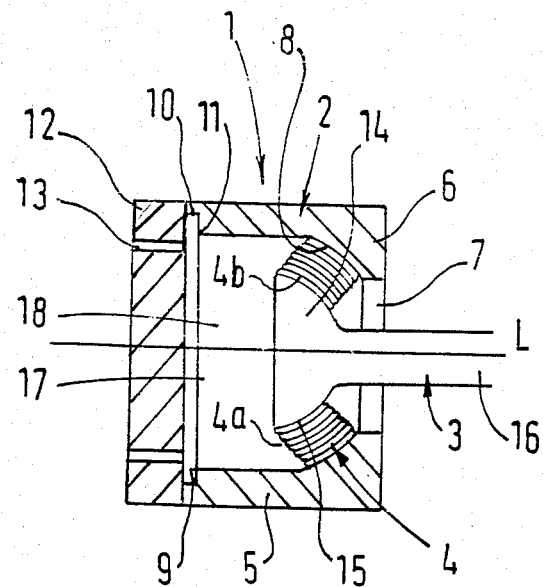
FIG. 1 shows in longitudinal section a first embodiment of joint means according to the present invention in the unloaded condition.
Figure 2:
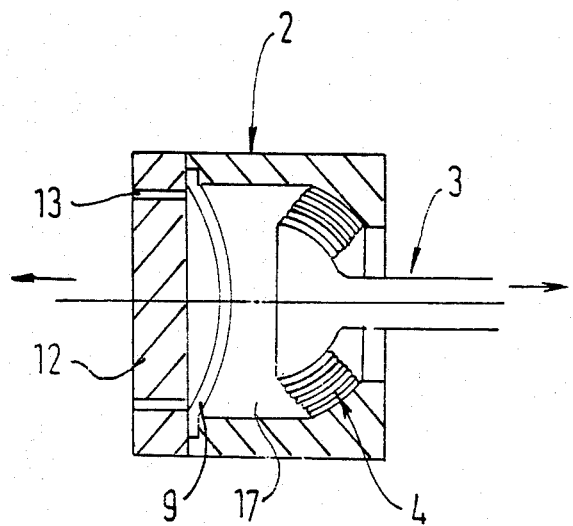
FIGS. 2 and 3 show in longitudinal section the joint means of FIG. 1 under axial tension and compression loads respectively.
Figure 3:
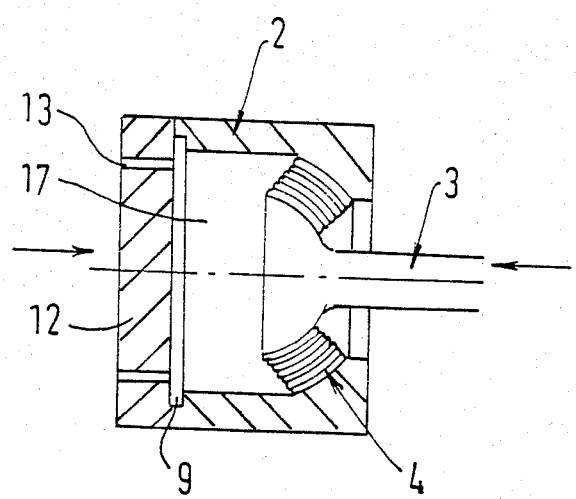

The joint means 1 shown in FIGS. 1 to 3 of the accompanying drawings comprises a hollow outer member 2, an inner member 3 and a flexible bearing 4 acting between the outer and inner members.

Outer member 2 includes a tubular body portion 5 having an internal radially inwardly directed flange 6 at one end defining a central opening 7 and an internal part-spherical surface 8 surrounding the opening 7. The other end of the body portion 5 is closed by an annular flexible diaphragm 9 the peripheral edge of which is received and retained in an annular groove 10 defined by a rebate 11 in the end face of the body portion 5 and the edge of a rigid end plate 12 attached to the end face by any suitable means (not shown) e.g. bolting. End plate 12 is formed with several vent holes 13 for a purpose to be described in more detail below.

Inner member 3 has a body portion 14 defining an external part-spherical surface 15 opposite to and axially spaced from the internal part-spherical surface 8 on the outer member 2 and, integral with the body portion 14, a stem 16 which projects outwards through the opening 7 in the outer member and is coaxial with the longitudinal axis of the joint means.

The flexible bearing 4 comprises a plurality of annular part-spherical rings consisting of layers of elastomer 4a and rigid reinforcement plates 4b arranged alternately with the end rings being of complementary profile to and secured to the confronting part-spherical surfaces 8 and 15.

The body portion 5 of outer member 2, bearing 4, body portion 14 of inner member 3 and flexible diaphragm 9 together define a fluid tight chamber 17 filled with a substantially incompressible fluid 18 such as a castor based fluid under a pressure of 500 psi.

Operation of the above-described joint means will now be described in more detail. Referring first to FIG. 1 in which the joint means is shown in the static or unloaded condition, the elastomeric layers 4a are pre-loaded in compression by the fluid pressure in chamber 17 and the diaphragm 9 subjected on one side to the fluid pressure in chamber 17 and on the other side through vent holes 13 to the external pressure of the surroundings, here air at atmospheric pressure, if flattened against the end plate 12.

Referring now to FIG. 2 which shows the effect of applying a tension load to either of the members 2,3 of the joint means shown in FIG. 1. Consider for example a tension load applied to the inner member 3, as the tension load increases the elastomeric layers 4a are subjected to increased compression and the inner member 3 deflects to the right as viewed in the drawing in the direction of the tension loading. As a result the volume of the chamber 17 increases leading to a reduction in the pressure of fluid in the chamber 17 until the pressure is at atmospheric. At this point diaphragm 9 is deflected to the right away from end plate 12 and air at atmospheric pressure is drawn into the space between the diaphragm 9 and end plate 12. In this condition the pressure acting on either side of the diaphragm is equalised and increased deflection of member 3 does not cause any further reduction in the fluid pressure in chamber 17, i.e. the fluid pressure in chamber 17 is prevented from going negative.

Referring now to FIG. 3 which shows the effect of applying a compression load to either of the members 2,3 of the joint means shown in FIG. 1. Consider for example a compression load applied to the inner member 3, as the compression load increases the elastomeric layers 4a are subjected to reduced compression and the load is taken by an increase in the pressure of the fluid in the chamber 17 which being substantially incompressible prevents deflection of the inner member 3 to the left as viewed in the drawing in the direction of compression loading, i.e. the occurence of tensile forces in the elastomeric layers 4a is prevented. Operation of the joint means 1 under tension and compression loads applied to the outer member 2 is similar to that just described with regard to the inner member 3.

In addition to its function in accommodating compression loads applied to the joint means 1 as above-described, the presence of pressurised fluid 18 in chamber 17 results in an increase in the fatigue performance of joint means by reducing the actual working deflection of the bearing without increasing the maximum percentage compression thereof as follows; assume the joint means is designed to operate over a working range of tension loads from 200 to 1500 tons and in the absence of fluid pressure in the chamber 17 total deflection of the bearing over this range is X mm which is equivalent to a percentage compression range of say 0.5 to 3.5%. Now assume the fluid pressure in chamber 17 in the joint means according to the present invention provides a pre-loading of 600 tons in the flexible bearing which produces an initial deflection of Y mm in the static or unloaded condition. As above-described the fluid pressure in chamber 17 reduces with increase in tension load with the result that at a tension load of 1500 tons the contribution from the fluid pressure is considerably reduced and the total deflection of the bearing is substantially the same as in the absence of fluid pressure in the chamber 17, i.e. the working deflection of the bearing has been reduced from X mm to (X-Y mm) which is equivalent to a percentage compression range of say 1.5 to 3.5%.

Further advantages arising from the ability of the joint means according to the present invention to carry both tension and compression loads using a single flexible bearing are reduced conical stiffness of the joint means as compared with the prior art joint means requiring a pair of flexible bearings arranged to provide an equivalent function and also the reduced cost of manufacture of which the bearing constitutes a major proportion.

Figure 4:
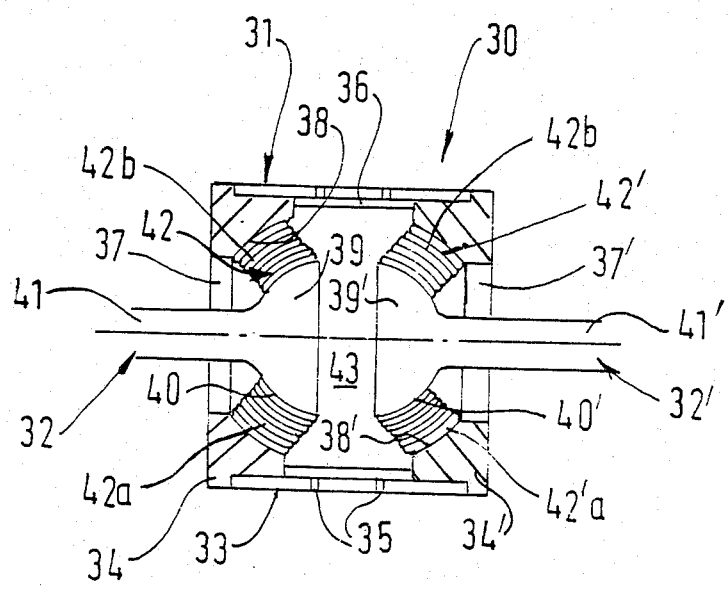
FIG. 4 shows in longitudinal section a second embodiment of joint means according to the present invention in the unloaded condition.
Figure 5:
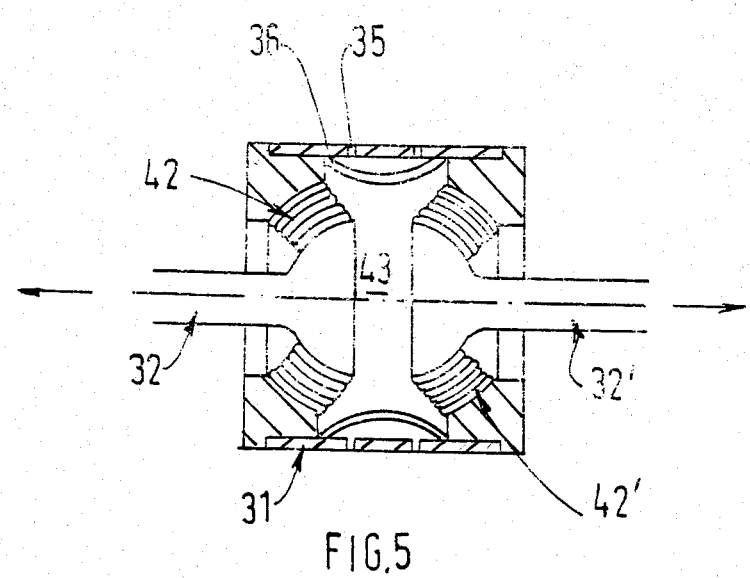
FIGS. 5 and 6 show in longitudinal section the joint means of FIG. 4 under axial tension and compression loads respectively.
Figure 6:
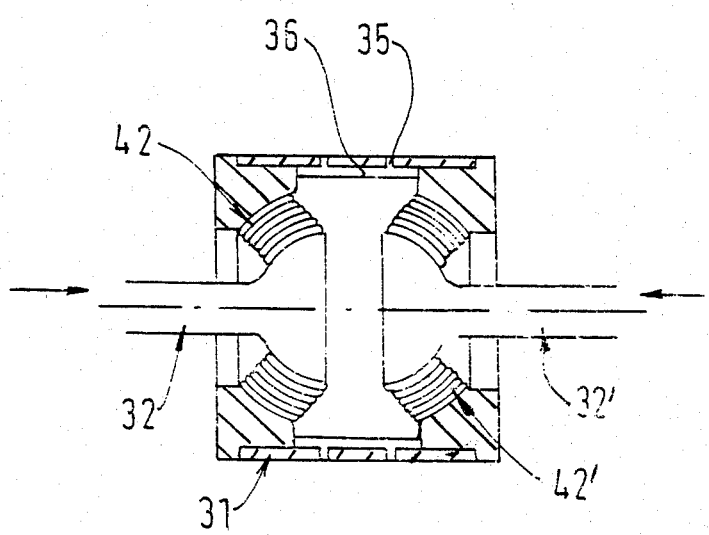

Turning now to FIGS. 4 to 6 there is shown a second embodiment of joint means 30 according to the present invention utilising a hollow outer member 31 and two inner members 32,32' arranged back-to-back to accommodate larger conical angles than the joint means 1 of FIGS. 1 to 3.

The outer member 31 comprises a tubular body 33 having a respective apertured end plate 34,34' attached to either end. The centre portion of the body 33 between the end plates is formed with a plurality of vent holes 35 which are closed by an internal cylindrical diaphragm 36 attached at either end to the body 33. Each end plate 34,34' is similar having a central opening 37,37' and an internal part-spherical surface 38,38' extending around the associated opening.

Each inner member 32,32' is similar having a body portion 39,39' defining an external part-spherical surface 40,40' and a stem portion 41,41' integral therewith. Each body portion 39,39' is disposed within the outer member 31 adjacent to a respective one end thereof with the associated stem portion 41,41' projecting outwards through the opening 37,37' in the adjacent end plate 34,34'. The stem portions 41,41' are axially aligned and co-axial with the longitudinal axis of the joint means.

A respective flexible bearing 42,42' acts between confronting part-spherial surfaces 38,40 and 38',40' on the inner and outer members. Each bearing 42,42' is similar comprising a plurality of annular part-spherical rings consisting of layers of elastomer 42a,42'a and rigid reinforcement plates 42b,42'b arranged alternately.

The end plates 34,34', body portion 39,39', bearings 42,42' and diaphragm 36 together define a fluid tight chamber 43 within the outer member in which a substantially incompressible fluid is contained under pressure.

Operation of the joint means 30 shown in FIGS. 4 to 6 under tension and compression loads applied to either inner member is substantially similar to that described with reference to the embodiment of FIGS. 1 to 3 i.e. the flexible bearings 42,42′ are pre-loaded in compression by the fluid pressure in chamber 43 and tension loads are carried by an increase in the compression in the bearings accompanied by a reduction in the fluid pressure in the chamber 43 until it equals the external atmospheric pressure acting through vent holes 35 and compression loads are carried by an increase in the fluid pressure in the chamber 43.

The ability of the joint means according to the present invention to carry both compression and tension loads makes it particularly suitable for incorporation in the anchor lines used so secure floating oil rig platforms to the sea bed where movement off the platform can result in widely varying compression and tension loads being applied to the joint means via the anchor line. More particularly the joint means of FIGS. 1 to 3 may be used to secure the ends of such a line by attaching the outer member to the platform or sea bed and the stem of the inner member to the anchor line while the joint means of FIGS. 4 to 6 may be used to join successive lengths of such a line by attaching the stem portion of each inner member to the adjacent ends of two successive lengths.

Figure 7:
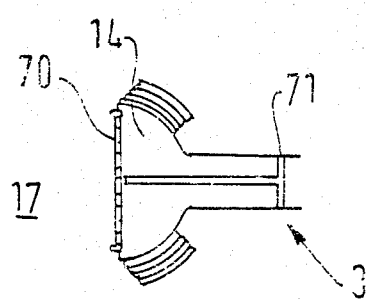
FIGS. 7 to 12 show various modifications to the joint means of FIGS. 1 to 3 and FIGS. 4 to 6.
Figure 8:
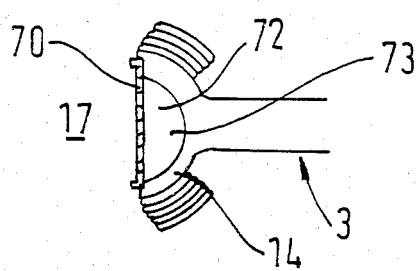

It will be understood that the invention is not restricted to the above-described embodiments for example as shown in FIGS. 7 and 8 the flexible diaphragm 9 of the joint means shown in FIGS. 1 to 3 may be replaced by a flexible diaphragm 70 attached around the periphery thereof to the end face of the body portion 14 of the inner member 3. The diaphragm 70 is subjected on one side to the fluid pressure in the chamber 17 and on the reverse side to either the external pressure of the surroundings via a vent line 71 formed in the inner member 3 (FIG. 7) or the pressure of fluid contained in a fluid-tight cavity 72 defined by the diaphragm 70 and a recess 73 in the end face of the body portion 14 of the inner member 3 (FIG. 8).

Figure 9:
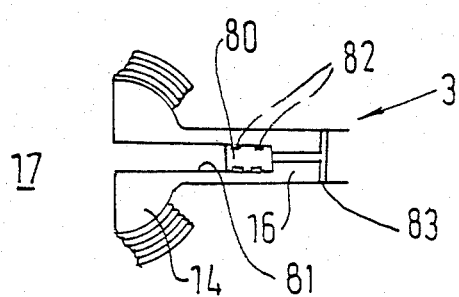
Figure 10:
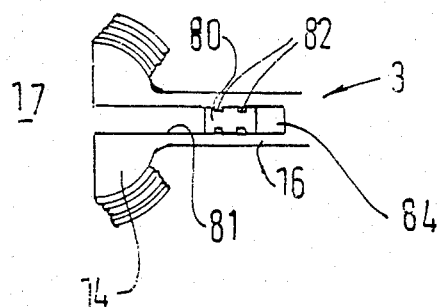

Alternatively as shown in FIGS. 9 and 10 the flexible diaphragm 70 shown in FIGS. 7 and 8 may be replaced by a shuttle 80 slidable in an axially extending bore 81 formed in the body portion 14 and stem 16 of the inner member 3 and sealed relative to the bore 81 by a pair of 0-rings 82. The shuttle 80 is subjected on one side to the fluid pressure in chamber 17 and on the reverse side to either the external pressure of the surrounds via a vent-line 83 formed in the inner member 3 (FIG. 9) or the pressure of fluid contained in a fluid-tight cavity 84 defined by the shuttle 80 and the closed end of bore 81 (FIG. 10).

The fluid contained in the fluid-tight cavities 72, 84 may be gas or liquid, preferably the same as the fluid contained in the chamber 17, and the fluid pressures in both chambers are equalised in the unloaded condition. Conveniently the cavities 72,84 are filled through a channel (not shown) in the inner member which is sealed by a closure plug.

It will be appreciated that each of the modifications shown in FIGS. 7 to 10 may be incorporated in the joint means of FIGS. 4 to 6 wherein one or both of the inner members 32,32′ may be constructed as shown in FIGS. 7 to 10 or any combination thereof.

Figure 11:
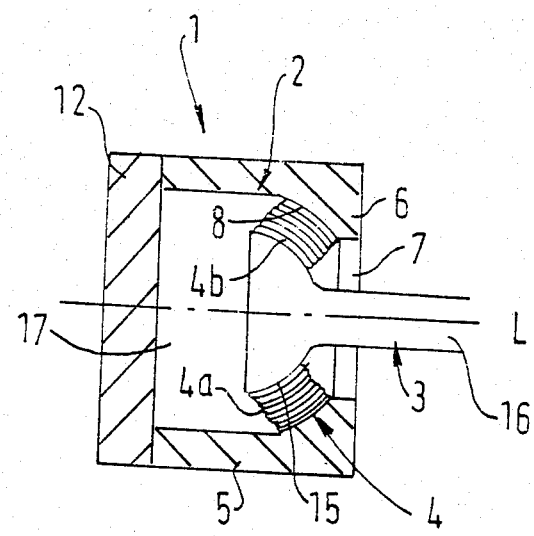
Figure 12:
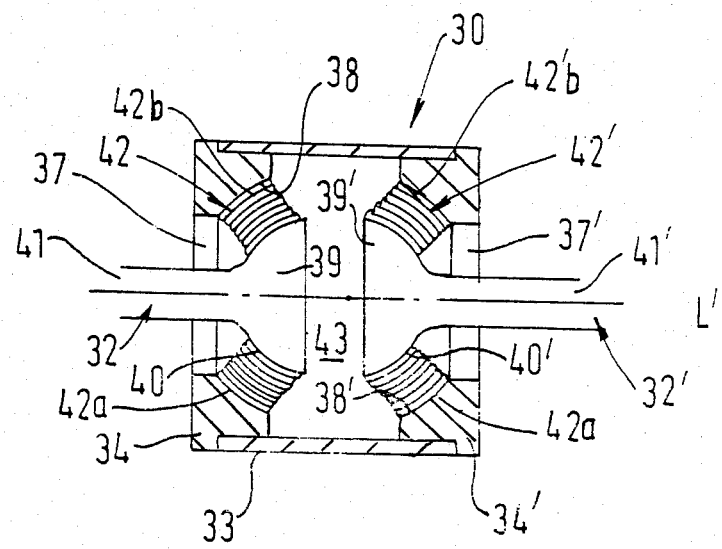

In yet a further modification shown in FIGS. 11 and 12 the diaphragms 9 and 36 of the joint means shown in FIGS. 1 to 3 and 4 to 6 respectively are omitted and the fluid tight chambers 17 and 43 filled with a combination of gas and liquid under pressure to pre-load the bearings 4 and 42,42′ in compression. The volume of gas, usually considerably less than the volume of liquid, is selected so that under maximum tension load the internal fluid pressure within the chamber does not fall below the external pressure of the surroundings and under the compression load the internal fluid pressure with the chamber rises rapidly to carry the load, the initial internal fluid pressure being selected to ensure that the bearings never go into tension under compression loading. The gas and liquid may be in contact with one another or separated by a suitable membrane e.g. the gas maybe contained within a sealed envelope. Suitable combinations of gas and liquid are air and water containing a rust inhibitor.

Other modifications (not illustrated) include the provision of a sealed cavity containing fluid acting on the reverse side of the diaphragms 9 and 36 of the joint means shown in FIGS. 1 to 3 and 4 to 6 respectively. Such sealed cavity could be disposed externally of the outer members or the diaphragms 9,36 could be constructed to sub-divide the chamber within the outer member into two fluid-tight compartments. Alternatively the outer member of the joint means shown in FIGS. 1 to 3 and 4 to 6 could be provided with a sliding shuttle arrangement similar to those shown in FIGS. 9 and 10 in place of the flexible diaphragms 9,36.

The confronting surfaces on the inner and outer members may be part-cylindrical to provide pivotal movement in one plane only containing the longitudinal axis of the joint means.

The stem portions of the inner members may be formed integrally with the body portion as described or the stem portions may be formed separately and attached to the body portions by any suitable means e.g. bolting.

Having now described my invention what I claim is:

1. Flexible joint means comprising a hollow outer member, an inner member having a body portion located within said outer member and a stem portion projecting outwards through an opening in said outer member, a flexible bearing of elastomeric material acting between and secured to confronting external and internal surfaces on said inner and outer members respectively for absorbing tension loads and for accommodating relative pivotal movement between said members, a fluid-tight chamber within said outer member and a substantially incompressible fluid contained within said chamber for absorbing compression loads, wherein said flexible bearing of elastomeric material is preloaded in compression by the pressure of the fluid within said chamber.

2. Joint means according to claim 1 wherein said chamber is defined at least in part by a control element subjected on one side to the pressure of said fluid within said chamber and on the opposite side to an external fluid pressure.

3. Joint means according to claim 2 wherein said control element is a flexible diaphragm.

4. Joint means according to claim 2 wherein said control element is a slidable shuttle.

5. Joint means according to claim 2 wherein said external fluid pressure is atmospheric.

6. Joint means according to claim 2 wherein said external fluid pressure is that of a fluid contained within a sealed cavity.

7. Joint means according to claim 1 wherein said confronting surfaces are part-cylindrical, preferably having a common central axis.

8. Joint means according to claim 1 wherein said confronting surfaces are part-spherical, preferably having a common centre of curvature.

9. Joint means according to claim 1 wherein said bearing is of laminate construction comprising interleaving layers of elastomer and reinforcement.

10. Joint means according to claim 1 comprising two inner members having the associated body portions thereof located within said outer member and the associated stem portions thereof projecting outwardly in opposite directions through respective openings in said outer member and a respective flexible bearing acting between each inner member and said outer member.

* * * * *